United States Patent [19]

Solomon et al.

[11] Patent Number: 5,510,866
[45] Date of Patent: Apr. 23, 1996

[54] METHOD AND APPARATUS FOR PREVENTING FILM CREEP BY DELAYING DEACTIVATION OF FILM METERING MEMBER BY SHUTTER DRIVER MEMBER

[75] Inventors: Jeffrey A. Solomon; Jude A. SanGregory, both of Spencerport, N.Y.

[73] Assignee: Eastman Kodak Company, Rochester, N.Y.

[21] Appl. No.: 391,752

[22] Filed: Feb. 21, 1995

[51] Int. Cl.⁶ .................................................. G03B 17/42
[52] U.S. Cl. .................................... 354/204; 354/213
[58] Field of Search .................................. 354/204, 206, 354/213

[56] References Cited

U.S. PATENT DOCUMENTS

| | | |
|---|---|---|
| 3,748,991 | 7/1973 | Beach . |
| 3,750,545 | 8/1973 | Beach . |
| 3,756,134 | 9/1973 | Goff . |
| 3,774,513 | 11/1973 | Ettischer et al. . |
| 3,779,145 | 12/1973 | Ettischer et al. .................... 95/31 |
| 4,711,545 | 12/1987 | Crema . |

*Primary Examiner*—Monroe H. Hayes
*Attorney, Agent, or Firm*—Roger A. Fields; Armin B. Pagel

[57] ABSTRACT

To prevent photographs from being blurred by film creep, a camera having a spring-loaded shutter driver member that is movable from a cocked position to an uncooked position to operate the camera shutter and then to deactivate a film metering mechanism, is provided with a blocking member that is movable temporarily into the path of the shutter driver to stop the driver at an intermediate position after it has operated the shutter but before it deactivates the metering mechanism.

8 Claims, 3 Drawing Sheets

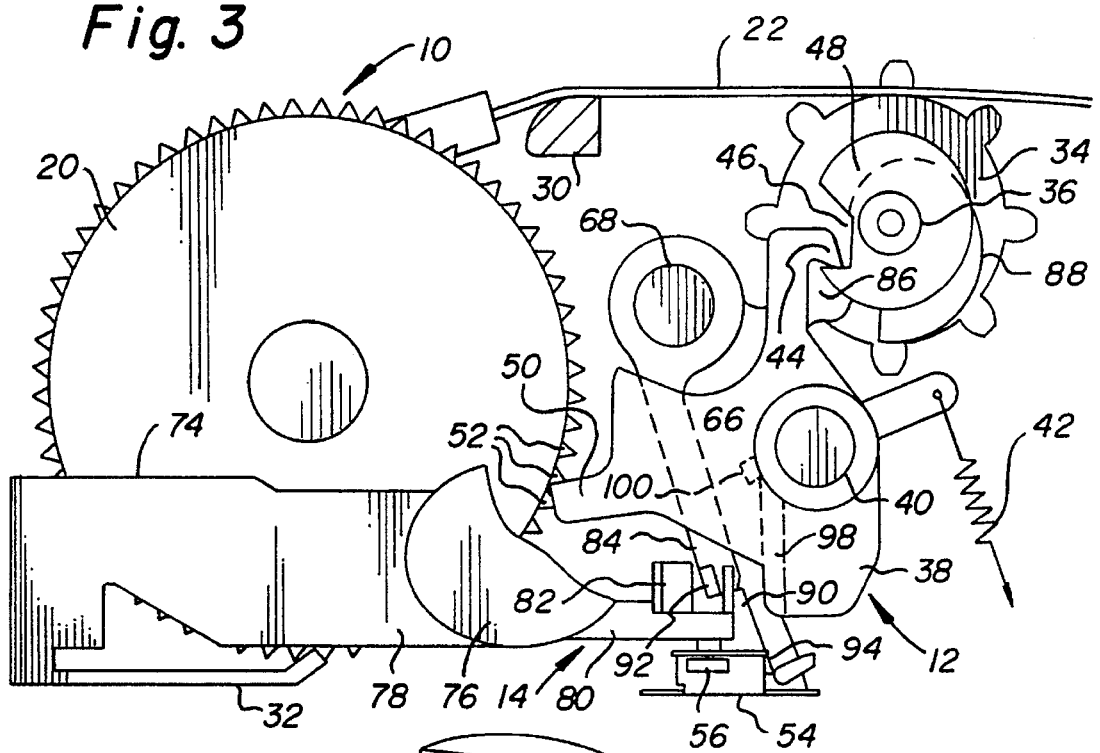
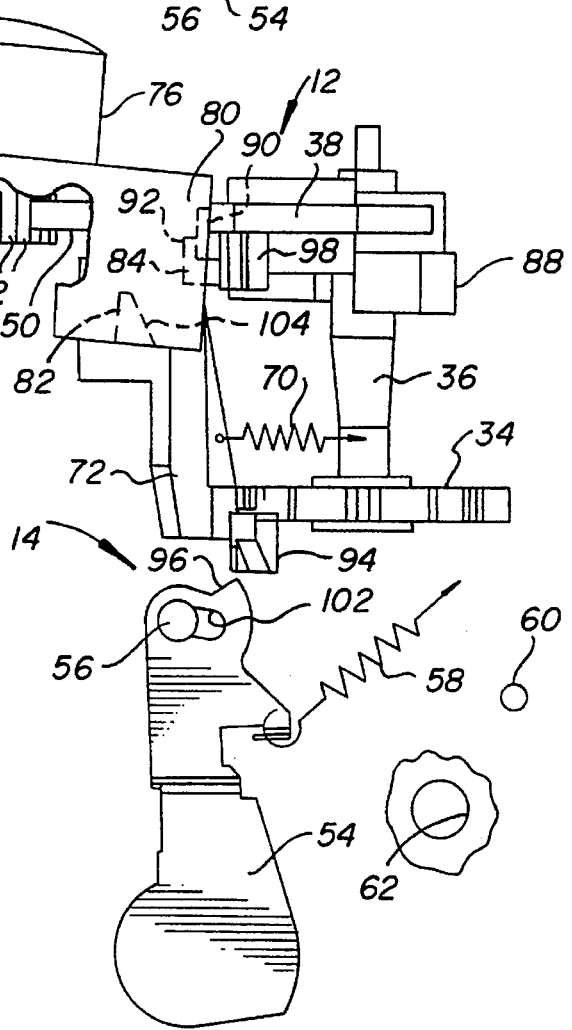
Fig. 3
Fig. 4

METHOD AND APPARATUS FOR PREVENTING FILM CREEP BY DELAYING DEACTIVATION OF FILM METERING MEMBER BY SHUTTER DRIVER MEMBER

CROSS-REFERENCE TO RELATED APPLICATIONS

Reference is made to commonly assigned copending applications Ser. No. 08/313,818, entitled FILM BRAKE APPLIED BY EXPOSURE INITIATION, filed Nov. 3, 1994 in the names of Jude A. SanGregory, Jeffrey A. Solomon and Albert E. Rieger and Ser. No. 08/391,807, entitled METHOD AND APPARATUS FOR PREVENTING FILM CREEP BY BLOCKING FILM METERING MEMBER DURING EXPOSURE, filed Feb. 21, 1995, in the names of Jude A. SanGregory and Jeffrey A. Solomon.

BACKGROUND OF THE INVENTION

1. Field of the Invention

The invention relates generally to the field of photography, and, in particular, to reducing the likelihood of so-called film creep, i.e. the movement of the camera film during exposure, which can occur if a camera element that prevents advancement of the film is deactivated either immediately before of during the opening of the camera shutter.

2. Description of the Prior Art

Many cameras employ a film advancing mechanism comprising a toothed metering wheel that is coupled to a rotatable film take-up core or spool and a metering mechanism comprising a metering member including a pawl that engages the metering wheel to stop the film advancement each time an unexposed image area of the film is brought into exposure position. In a typical 35 mm camera, the metering member is spring biased so that a tooth thereof bears against the edge of a notched actuator disk driven by an eight-tooth sprocket that is engaged with the metering perforations along an edge of the film; each exposure frame of the film corresponding to eight perforations. When the sprocket has rotated the actuator disk through a complete rotation, i.e. when the film has been advanced by one frame, the tooth of the metering member falls into the notch of the actuator disk. This activates the film metering member by allowing it to move to engage the metering pawl with the metering wheel, thereby temporarily blocking film advancement.

Following each exposure, the above-described mechanism must be deactivated in order to allow the film to be advanced to the next available film frame. In other words, the metering pawl must be disengaged from the metering wheel and the metering lever tooth must be withdrawn from the notch in the actuator disk.

In many relatively inexpensive cameras, the shutter is operated by a spring-loaded driver member, often referred to as a high energy lever. The driver member is cocked by the film advancing mechanism and is latched in its cocked condition until it is released by depression of the shutter release button. Thereupon, the driver member moves rapidly to an uncocked position, and, in so doing, momentarily opens the shutter to make an exposure. Additionally, various prior art cameras of this type use the shutter driver member to disable the film metering mechanism as the driver member approaches its uncocked position; thereby allowing the subsequent film advancing operation to be performed.

With such a mechanism, it is very likely that the film will be under a certain amount of tension when the metering wheel is locked by the metering pawl and the rotation of the sprocket is limited by the tooth in the notch of the actuator disk; or, stated another way, it is likely that the film will exert a certain amount of rotational force on the film winding core and/or on the sprocket. Furthermore, the metering wheel is also typically engaged by another resiliently biased pawl that prevents it from rotating in the opposite direction; and the interaction between this pawl and the metering pawl may also impart a rotational force to the metering wheel. Accordingly, when the metering mechanism is deactivated, the winding core and the sprocket are now free to rotate and to thereby relieve whatever forces were latent in the pawl arrangement or in the tensioned portion of the film; thereby tending to cause the exposure portion of the film slightly to move slightly relative to the axis of the camera's lens.

If the foregoing film movement occurs while the shutter is open, as is very likely if the deactivating operation is effected by the shutter driver member or high energy lever, as described above, the photograph will be blurred to a degree determined by the severity of such film movement or creep.

In an alternative type of metering mechanism, used, for example in various cameras designed for 110 or 126 size film, the metering pawl is engaged with the metering wheel when a film sensing tooth enters into a metering perforation in the film or is moved sideways by the film after having entered such a perforation. With such a mechanism, the deactivating operation includes retraction of the sensing tooth from the film rather than the removal of the metering member tooth from the actuator disk, but the problem of film creep is otherwise the same as described above.

To avoid or minimize the foregoing film creep problem, the invention to which the above-identified U.S. Patent application Ser. No. 08/313,818 is directed contemplates providing the shutter release mechanism with a brake member that engages the metering wheel as the shutter release button is depressed but before the metering mechanism is deactivated, thereby braking the metering wheel against rotation as long as the button remains depressed; i.e. during the deactivation of the metering mechanism. This approach, however, dictates the need for rather demanding tolerances to insure that the brake is engaged before such deactivation takes place, while at the same time avoiding excessive travel of the release button. Also, it requires that the release button be depressed with sufficient force to insure positive braking of the metering wheel. Furthermore, such an arrangement does nothing to avoid film creep that may be occasioned by the disengagement of the metering member from the film metering sprocket or its equivalent.

To address tile above-described problems inherent in the type of device to which the foregoing '818 Patent Application is directed, the invention to which the later '807 Patent Application is directed contemplates a camera of the previously described type in which the metering mechanism is deactivated by a shutter driver or high energy lever as the latter approaches its uncocked condition; but in which the shutter release device includes a blocking member that engages the activated metering member when the shutter release button is depressed and thereby temporarily prevents the metering member from being deactivated. When the button is allowed to return to its raised position, the blocking member releases the metering member so that the latter can be moved to its deactivated position by the final movement of the shutter driver to its uncocked position. However, by this time, the exposure has been completed and any film movement occasioned by the deactivation of the metering mechanism cannot blur the photograph. This construction, therefore, affords a very significant improvement. However, its successful operation is still dependent on satisfying rather exacting dimensional tolerances with regard to the relative positions of components of the shutter release and film metering mechanism. This is particularly critical if the periphery of the metering wheel is provided with relatively fine teeth, which is desirable to increase the accuracy of the metering mechanism.

SUMMARY OF THE INVENTION

The present invention is directed to a method and apparatus for overcoming the above described problems inherent in the types of camera mechanisms to which the above-identified Patent Applications are directed. More specifically, the present invention contemplates a camera of the previously described type in which the metering mechanism is deactivated by the shutter driver as the latter approaches its uncocked condition. However, in accordance with the invention, the shutter release device includes a stop member that deactivated by the movement of the shutter driver member to its uncocked position, thereby preparing the depicted is interposed in the path of the driver member when the shutter button is depressed and thereby temporarily blocks further movement of the drier member, after it has operated the shutter, but before it has deactivated the metering member.

Various means for practicing the invention and other advantages and novel features thereof will be apparent from the following description of an illustrative preferred embodiment, reference being made to the accompanying drawings.

BRIEF DESCRIPTION OF THE DRAWINGS

FIGS. 3 and 4 correspond respectively to FIGS. 1 and 2, but depict the shutter driver member temporarily blocked after it has moved sufficiently to operate the shutter but before it has reached a position at which it has deactivated the metering mechanism;

DESCRIPTION OF THE ILLUSTRATIVE PREFERRED EMBODIMENT

Figure 1:
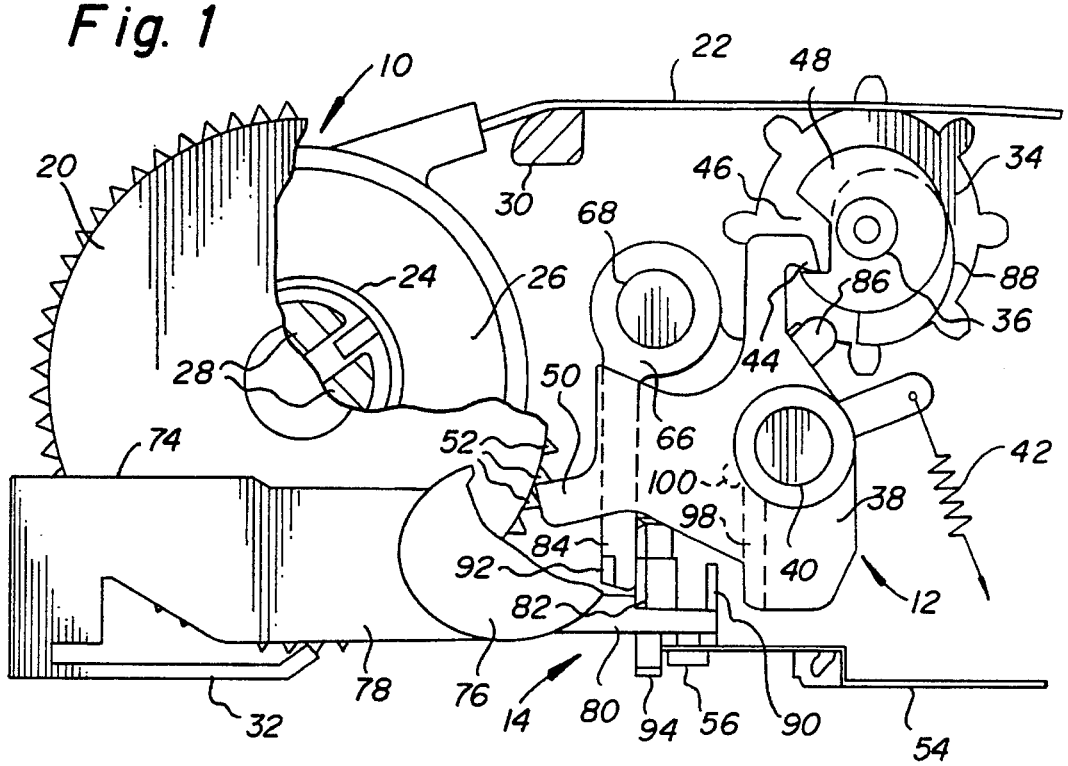
FIG. 1 is a top view of a camera with parts removed to show film advancing, metering and exposing mechanisms in accordance with a preferred embodiment of the invention, said film metering mechanism being shown in its activated condition after the film has been advanced and prior to initiation of an exposure.
Figure 2:
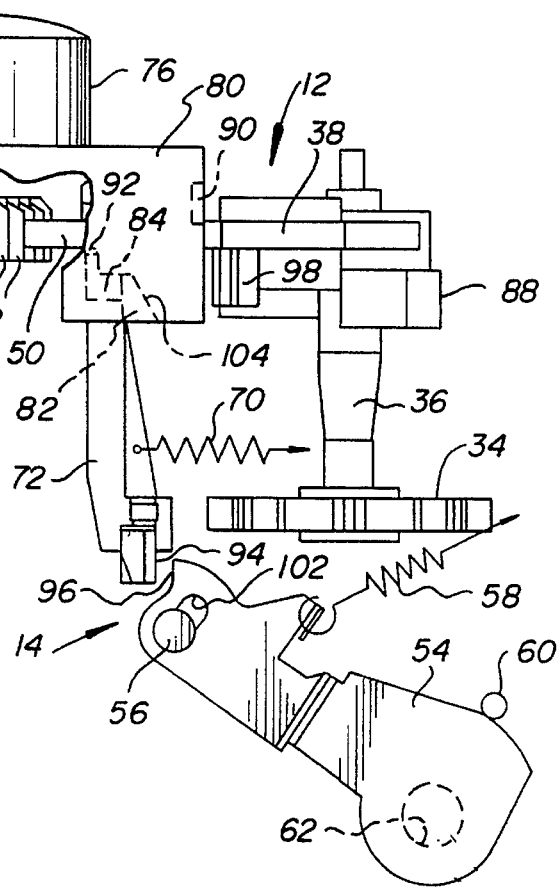
FIG. 2 is a front view corresponding generally to FIG. 1 depicting selected elements of the camera mechanisms shown in that figure.
Figure 7:
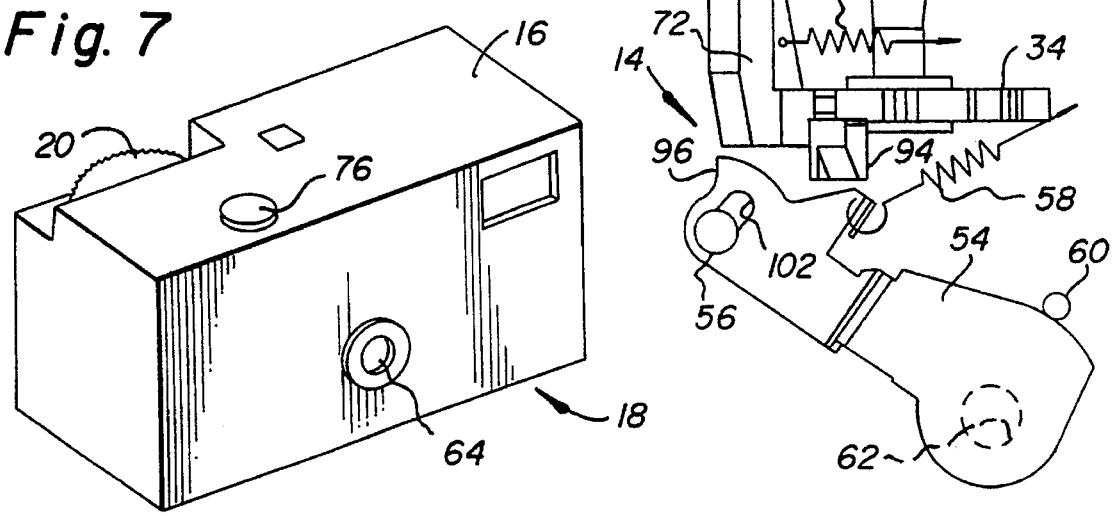
FIG. 7 is a perspective view of a camera incorporating the mechanisms shown in the preceding figures.

Referring first to FIGS. 1 and 2 of the drawings, reference numerals 10, 12 and 14 identify generally the respective film advancing, film metering and film exposure mechanisms incorporated in the illustrative preferred embodiment; such mechanisms being enclosed in a housing or casing 16 of a camera 18, as shown in FIG. 7.

The film advancing mechanism 10 includes a combined thumb wheel and metering wheel 20 mounted for rotation adjacent a top corner of the casing 16, with a portion of the wheel extending beyond the casing where it is accessible to the camera operator, as shown in FIG. 7. In the illustrative type of camera, the camera film 22 is initially wound on itself in a supply chamber, not shown, with its other end connected to a spool 24 in a conventional 35 mm type film cassette, partially shown at numeral 26. A key 28 attached to the thumb/metering wheel couples the wheel to the film cassette spool, whereby counterclockwise rotation of wheel 20 causes the film to be wound into the cassette and thereby advanced past the exposure position located beyond film guide member 30. An anti-backup pawl 32 is resiliently biased against the front edge of wheel 20 to prevent it from rotating except in a counterclockwise direction.

Instead of being combined with the thumb wheel, the metering wheel could be driven by a separate winding knob, winding lever, electric motor, etc. Also, the subject mechanism is equally applicable to cameras in which film is exposed as it is wound from a supply cassette onto a take-up spool rather than as it is rewound into a cassette.

The film metering mechanism comprises an eight-tooth film metering sprocket 34 supported for rotation by shaft 36 and engaged with perforations in the film so that the sprocket is rotated in a counterclockwise direction through a complete revolution each time the film is advanced by a distance corresponding to one frame.

A film metering member 38 is supported for pivotal movement by a stud 40 and is biased by coil spring 42 in a clockwise or activating direction. When tooth 44 on metering member 38 is received in notch 46 of actuator disk 48, integral with sprocket 34, the metering member moves to its activated position and its pawl 50 engages the toothed rim 52 of the thumb/metering wheel to temporarily block advancement of the film, as described in detail later.

The film exposure mechanism includes a shutter blade 54 that is pivotally supported by rivet 56 and biased in a counterclockwise direction by coil spring 58. Except during an exposure, blade 54 bears against stop pin 60 and covers the exposure aperture 62 behind the camera lens 64, shown in FIG. 7.

A shutter driver member or high energy lever 66 is pivotally mounted on shaft 68 and is biased in a counterclockwise direction by coil spring 70 attached to its depending finger 72. A shutter release member 74 includes a shutter release button 76 located near the cantilevered end of a flexible cantilevered arm 78. Adjacent the shutter release button, arm 78 is provided with a vertical web 80 that carries a latch member 82.

When the camera is in condition to make an exposure, as shown in FIGS. 1 and 2, tongue 84 of shutter driver member 66 is engaged by latch member 82 to hold member 66 in a cocked condition in opposition to spring 70. Also, the sprocket 34 is now rotated to a position in which tooth 44 of the metering member 38 has entered actuator disk notch 46, thereby allowing metering pawl 50 to engage the thumb/ metering wheel 20 under the influence of spring 42. Additionally, cam follower finger 86 of the shutter driver is out of contact with spiral cocking cam 88, which is integral with and located between the metering sprocket 34 and the actuator disk 48. As previously described, the shutter driver member is now latched in its cocked condition by latch member 82.

As the photographer depresses the shutter release button 76 to initiate an exposure, a stop member 90, carried by web 80 of the shutter release member, moves downwardly into the path of abutment member 92 on the top of tongue 84 of the shutter driver member 66, before latch member 82 disengages shutter driver tongue 84.

When the continuing downward movement of the shutter release button moves latch 82 out of engagement with tongue 84 of the shutter driver member, the latter is driven rapidly in a counterclockwise direction by spring 70. When it reaches the intermediate position shown in FIGS. 3 and 4, further movement of the shutter driver member is temporarily blocked by the engagement of stop member 90 on the shutter release member with the shutter driver abutment member 92.

As the shutter driver moves from the cocked position shown in FIGS. 1 and 2 to the intermediate position shown in FIGS. 3 and 4, as just described, a tab 94 at the lower end of the driver member finger 72 strikes shoulder 96 of shutter blade 54 and drives the latter momentarily to the position shown in FIGS. 3 and 4 to open the shutter. By the time the tab has reached the position shown in FIGS. 3 and 4, it has moved beyond the shutter blade shoulder, and the blade is free to return to its closed position under the influence of spring 58.

During the time the shutter is open, the stop member on the shutter release member continues to maintain the driver member in its intermediate position, metering member pawl 50 remains engaged with the thumb-metering wheel and tooth 44 remains in the notch 46 of the actuator disk. Accordingly, the film metering mechanism is not deactivated prior to or during the film exposure and therefore cannot be a factor in the previously described film creep phenomenon.

Figure 5:
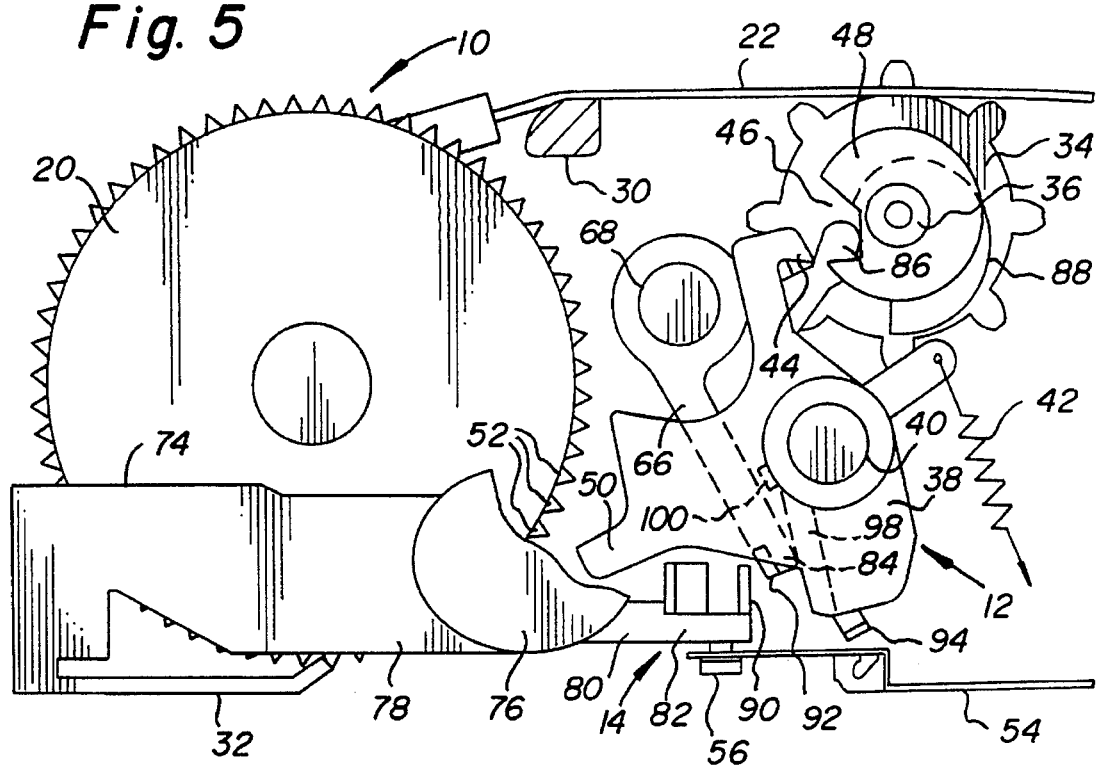
FIGS. 5 and 6 correspond respectively to FIGS. 1 and 2, but illustrate the metering mechanism deactivated by the movement of the shutter driver member to its uncocked position, thereby preparing the depicted mechanisms for the next film advancing operation.

After the film exposure has been completed, the release of the shutter release button allows the stop member 90 to move upwardly out of engagement with the abutment member 92 of the shutter driver member 66. Thereupon, spring 70 moves the shutter driver in a counterclockwise direction beyond its intermediate position so that its tongue 84 moves into engagement with ear 98, extending downwardly from metering member 38. As the shutter driver continues to move to its uncocked position shown in FIGS. 5 and 6, which is defined by its engagement with metering member abutment 100, spring 70 causes shutter driver tongue 84 to rotate metering member 38 to its deactivated position, by overpowering the weaker force exerted on the metering member by spring 42. Accordingly, the metering pawl 50 is disengaged from the thumb/metering wheel 20 and the metering member tooth 44 is retracted from the actuator disk notch 46; thereby allowing the film advancing mechanism to be operated to advance the film to the next available frame.

As is best shown in FIG. 3, the shutter driver tongue 84 is spaced somewhat from the metering member ear 98 when the shutter driver member is arrested by stop member 90. This spacing, which can be increased if desired, is important because it avoids a critical tolerance with regard to the intermediate position at which the movement of the tongue is temporarily blocked, which must occur after the shutter has been operated, but before the metering member is deactivated.

When the photographer now rotates thumb/metering wheel 20 in a counterclockwise direction, the film is wound onto the spool in the cassette 26 and causes the metering sprocket 34 to rotate in the same direction. During such rotation, cocking cam 88 engages cam follower finger 86 of the shutter driver 66 and rotates the latter in a clockwise direction back to its cocked position shown in FIGS. 1 and 2. During this movement, the tab 94 on driver member finger 72 moves past the shoulder 96 of the shutter blade by camming the upper end of the blade downwardly, which is made possible by the elongated slot 102 that receives the blade supporting rivet 56.

Figure 6:
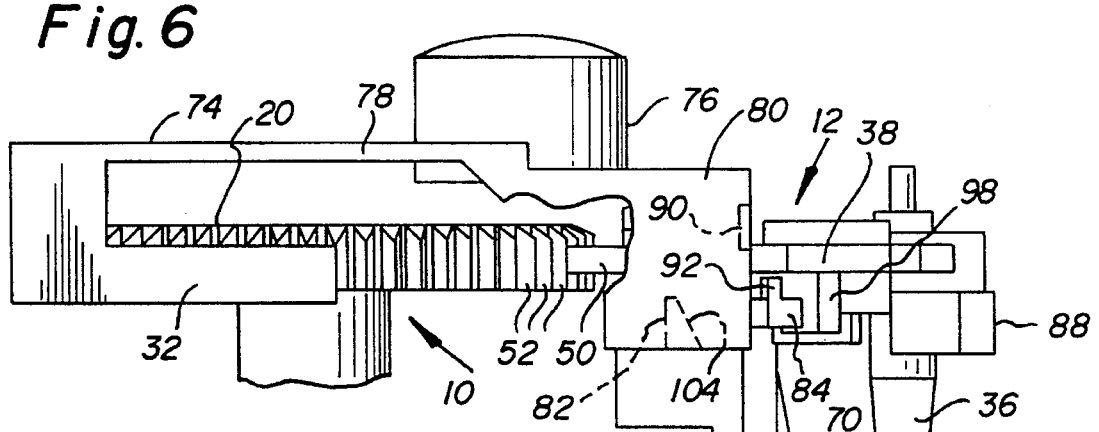

When tongue 84 encounters the sloped face 104 of latch member 82, the corresponding end of the shutter release member is momentarily cammed downwardly beyond the position shown in FIGS. 2 and 6 to allow tongue 84 to move past the latch member so that the shutter driver is again latched in its cocked position. The continuing advancement of the film then causes the cocking cam 88 to move beyond the cam follower finger 86 before the sprocket has completed a full revolution. When that occurs, the metering member tooth 44 again enters the notch 46 in the actuator disk and causes the metering member to block further film winding; thereby returning the depicted camera mechanisms to the condition illustrated in FIGS. 1 and 2.

The invention has been described in detail with particular reference to an illustrative preferred embodiment thereof, but it will be understood that variations and modifications can be effected within the spirit and scope of the invention.

| PARTS LIST FOR FIGS. | |
|---|---|
| Reference No. | Part |
| 10. | Film advancing mechanism |
| 12. | Film metering mechanism |
| 14. | Film Exposure mechanism |
| 16. | Casing |
| 18. | Camera |
| 20. | Thumb/metering wheel |
| 22. | Film |
| 24. | Spool |
| 26. | Film Cassette |
| 28. | Key |
| 30. | Film guide members |
| 32. | Anti-backup pawl |
| 34. | Metering sprocket |
| 36. | Hub |
| 38. | Film metering member |
| 40. | Stud |
| 42. | Coil spring |
| 44. | Tooth |
| 46. | Notch |
| 48. | Actuator disk |
| 50. | Metering pawl |
| 52. | Toothed rim |
| 54. | Shutter Blade |
| 56. | Rivet |
| 58. | Coil spring |
| 60. | Stop pin |
| 62. | Aperture |
| 64. | Lens |
| 66. | Shutter driver member or high energy lever |
| 68. | Shaft |
| 70. | Coil spring |
| 72. | Finger |
| 74. | Shutter release member |
| 76. | Shutter release button |
| 78. | Flexible arm |
| 80. | Vertical web |
| 82. | Latch member |
| 84. | Tongue |
| 86. | Cam follower finger |
| 88. | Cocking cam |
| 90. | Stop member |
| 92. | Abutment member |
| 94. | Tab |
| 96. | Shoulder |
| 98. | Ear |
| 100. | Abutment |
| 102. | Elongated Slot |

-continued

| PARTS LIST FOR FIGS. | |
|---|---|
| Reference No. | Part |
| 104. | Sloped face |

What is claimed is:

1. A photographic camera adapted to be loaded with an elongate strip of film and including a film advancing mechanism, a metering mechanism capable of being activated to temporarily block film advancement by said film advancing mechanism, a shutter operable to expose said film, and a shutter driver resiliently biased for movement along a predetermined path from a cocked position to an uncocked position to operate said shutter and then to engage and deactivate said metering mechanism so that said film can again be advanced; characterized by:

blocking means for temporarily blocking said movement of said shutter driver at an intermediate position between said cocked and uncocked positions after said driver has operated said shutter but before said driver has deactivated said metering mechanism.

2. The invention of claim 1 including latch means for releasably retaining said shutter driver in said cocked position and a shutter release member that is manually movable to release said latch means to initiate said movement of said shutter driver, said blocking means comprising a stop member movable by such movement of said shutter release member into said path of said shutter driver to temporarily block said shutter driver at said intermediate position.

3. The invention of claim 2 in which said shutter release member includes a button accessible from the exterior of said camera.

4. The invention of claim 2 in which said film advancing mechanism includes a film winding member and a metering wheel provided with peripheral teeth and rotatable with said winding member, said metering mechanism comprising a metering member including a pawl engageable with the periphery of said metering wheel to block film advancing rotation of said wheel.

5. The invention of claim 4 in which a portion of the periphery of said wheel is accessible from the exterior of said camera to allow manual rotation of said wheel for advancing said film.

6. The invention of claim 4 in which said metering member is biased toward engagement with said wheel by a resilient engaging force capable of being overpowered by said resilient force by which said shutter driver is biased toward said uncocked position, whereby said metering mechanism is deactivated by the engagement of said shutter driver therewith.

7. A photographic camera including, (a) a film advancing mechanism for advancing a strip of film past an exposure position, (b) a metering member movable between an inactive position and an active position in which said metering member engages said film advancing mechanism to temporarily prevent film advancement, and (c) a film exposure mechanism including a shutter, a spring loaded shutter driver member, latch means releasably latching said shutter driver member in a cocked position, and a shutter release member that is manually movable from a first position to a second position to release said latch means so that said spring-loaded shutter driving member moves to an uncocked position and thereby operates said shutter and then engages and moves said metering member to said inactive position; characterized in that:

said film exposure mechanism includes a blocking member operable by movement of said shutter release member toward said second position to block movement of said shutter driver at a position beyond the range of movement in which said shutter driver operates said shutter but in advance of the range of movement in which said shutter driver engages and moves said metering member.

8. A method for preventing film creep in a camera adapted to be loaded with an elongate strip of photographic film and including a film advancing mechanism, a metering mechanism capable of being activated to temporarily block film advancement by said film advancing mechanism, a shutter operable to expose said film, and a shutter driver resiliently biased for movement along a predetermined path from a cocked position to an uncocked position to operate said shutter and then to engage and deactivate said metering mechanism so that said film can again be advanced; said method being characterized by:

moving a blocking member into said path of said driver member to stop said driver member at an intermediate position beyond the range in of movement which said shutter driver operates said in shutter but advance of the range of movement in which said shutter driver engages and deactivates said metering mechanism, and removing said blocking member from said path after said operation of said shutter has been completed.

* * * * *